United States Patent [19]

Okamura

[11] Patent Number: 5,648,875

[45] Date of Patent: Jul. 15, 1997

[54] OPTICAL SCANNING SYSTEM HAVING ERROR CORRECTION

[75] Inventor: Tetsurou Okamura, Nagano-ken, Japan

[73] Assignee: Sankyo Seiki Mfg. Co., Ltd., Nagano-ken, Japan

[21] Appl. No.: 280,890

[22] Filed: Jul. 27, 1994

[30] Foreign Application Priority Data

Aug. 11, 1993 [JP] Japan ................... 5-199694

[51] Int. Cl.[6] ............. G02B 3/00; G02B 26/08
[52] U.S. Cl. ............. 359/662; 359/206
[58] Field of Search ............. 359/662, 206, 359/216

[56] References Cited

U.S. PATENT DOCUMENTS

| | | | |
|---|---|---|---|
| 4,786,151 | 11/1988 | Hamada | 359/662 |
| 5,179,465 | 1/1993 | Kondo | 359/218 |
| 5,189,546 | 2/1993 | Iizuka | 359/217 |
| 5,196,957 | 3/1993 | Brueggemann | 359/206 |
| 5,200,850 | 4/1993 | Iizuka | 359/206 |
| 5,220,450 | 6/1993 | Iizuka | 359/205 |
| 5,255,113 | 10/1993 | Yoshikawa | 359/196 |
| 5,329,399 | 7/1994 | Ho | 359/622 |
| 5,442,477 | 8/1995 | Iima | 359/205 |

*Primary Examiner*—Georgia Y. Epps
*Assistant Examiner*—Ricky Mack
*Attorney, Agent, or Firm*—McAulay Fisher Nissen Goldberg & Kiel, LLP

[57] ABSTRACT

A novel optical scanning system which is cheap to manufacture, which exhibits an excellent $f_\theta$ characteristic and which satisfactorily corrects curvature of field in a sub scanning parallel direction. The optical scanning system is formed by two or more lenses. One of the two or more lenses is a corrector lens which corrects curvature of field in the sub scanning parallel direction. The corrector lens is made of plastic so as to have a substantive power only in the sub scanning parallel direction. The corrector lens is smoothly curved along its longitudinal direction into a shape which corrects curvature of field in the sub scanning parallel direction. The cross-sectional configuration of the corrector lens taken in a plane which is parallel to a central optical axis and perpendicular to a main scanning parallel direction is approximately constant along the longitudinal direction of the corrector lens.

6 Claims, 5 Drawing Sheets

OPTICAL SCANNNG SYSTEM HAVING ERROR CORRECTION

BACKGROUND OF THE INVENTION a) Field of the Invention

The present invention is directed to an optical scanning system. An optical scanning system according to the present invention is applicable to an optical scanning apparatus which has a function to correct facet error.

b) Description of the Related Art

An optical beam printer, a digital copying machine or the like usually utilizes an optical scanning apparatus which deflects luminous flux from a light source at a constant angular velocity by "an optical deflector which includes a deflecting reflection facet" such as a rotation polygon mirror, a rotation uni-facial mirror and a rotation dual-facial mirror and which thereafter focuses deflected luminous flux by the optical scanning system on a surface-to-be-scanned as a light spot.

For instance, as an optical scanning apparatus which deflects luminous flux from a light source apparatus and focuses deflected luminous flux by an imaging lens system on a surface-to-be-scanned as a light spot, various types of optical scanning apparatus are conventionally known for use in an optical beam printer. FIG. 5 shows two typical examples of such an optical scanning apparatus.

In FIG. 5(A), a light source apparatus 510 comprises a semiconductor laser and a collimating lens which collimates laser luminous flux from the semiconductor laser into parallel luminous flux, for example, to emit parallel luminous flux. The emitted parallel luminous flux impinges upon and is reflected at one of deflecting reflection facets 521 of a rotation polygon mirror 520 which serves as a deflector, whereby the parallel luminous flux is deflected at a constant angular velocity while the rotation polygon mirror 520 is rotated.

The deflected luminous flux is then focused by an imaging lens system which is made of an $f_\theta$ lens 531 and a long cylinder lens 533 on a surface-to-be-scanned 540 as a light spot. Thus, an optical scanning operation is performed at a constant speed as the luminous flux is deflected.

In general, in an imaginary situation in which an optical path from the light source apparatus to the surface-to-be-scanned is linearly developed, a direction which is parallel to a primary scanning direction is referred to as "a main scanning parallel direction" while a direction which is parallel to a sub scanning direction is referred to as "a sub scanning parallel direction."

In FIG. 5(B), the parallel luminous flux emitted from the light source apparatus 510 is converged only in the sub scanning parallel direction by the cylinder lens 511, of an imaging optical system forming a slit image, and focused as "a long slit image which extends in the main scanning parallel direction" in the vicinity of the deflecting reflection facets of the rotation polygon mirror 520. The luminous flux is reflected and deflected by the deflecting reflection facets to become a deflected luminous flux and is focused by the imaging lens system which is made of the $f_\theta$ lens 532 and the long cylinder lens 534 on the surface-to-be-scanned 540 as a light spot. The light spot scans the surface-to-be-scanned 540 in the main scanning parallel direction.

The surface-to-be-scanned indicated at 540 in FIG. 5 is an imaginary plane on which the deflected luminous flux is focused as a light spot. In general, a photosensitive medium which has a photoconductivity is placed so that its surface coincides with this surface-to-be-scanned.

Here arises a problem known in the art as "a facet error," that is, a variation in the position of an optical scanning line in the sub scanning direction. In a rotation polygon mirror, a facet error is created due to "variations" among a plurality of deflecting reflection facets of the rotation polygon mirror in terms of their angles to a rotation axis of the rotation polygon mirror which are supposed to be parallel. In a rotation uni-facial mirror and a rotation dual-facial mirror, a cause of a facet error is "unsteadiness" of a rotation axis of the rotation uni-facial mirror or the rotation dual-facial mirror.

A widely known solution to correct a facet error is to focus luminous flux from a light source in the sub scanning direction as a long slit image which extends in the primary scanning direction in the vicinity of a deflecting reflection facet while forming an optical scanning system so that the position of a deflecting reflection facet and the position of a surface-to-be-scanned are in geometric optical conjugation in the sub scanning parallel direction.

An optical scanning system used in this kind of optical scanning apparatus is "an anamorphic" imaging optical system whose power in the main scanning parallel direction is different from its power in the sub scanning parallel direction.

In order to perform excellent optical scanning with an optical scanning apparatus, it is necessary to ensure that "the diameter of a light spot does not largely change depending on an image height" and that "the moving speed of the light spot is constant."

A change in the diameter of a light spot depending on an image height is attributed to curvature of field within the optical scanning system. If the diameter of a light spot is changed in dependence on an image height, a resolving power of an image which is recorded by optical scanning varies. Although a change in the diameter of a light spot in the main scanning parallel direction can be corrected by electrically controlling a signal which is transferred with deflected light, a change in the diameter of the light spot in the sub scanning parallel direction can not be corrected in a similar manner.

As is well known, the equality in the moving speed of a light spot has a dependency on "the $f_\theta$ characteristic" of an optical scanning system. In the case where the equality in the moving speed of a light spot is poor due to insufficient correction of the $f_\theta$ characteristic, a distortion of a recorded image will be generated.

Hence, to realize excellent optical scanning, the $f_\theta$ characteristic and curvature of field in the sub scanning parallel direction of an optical scanning system must be excellently corrected. However, it is not always easy to satisfactorily correct both the $f_\theta$ characteristic and curvature of field in the sub scanning parallel direction of an anamorphic lens. For example, in an optical scanning system disclosed by Japanese Patent Unexamined Publication No. SHO 61-275814, a surface for correcting curvature of field in the sub scanning parallel direction is complicated in configuration, so that manufacturing a system of the lens is expensive.

OBJECTS AND SUMMARY OF THE INVENTION

The present invention has been made to solve such a problem. Accordingly, it is an object of the present invention to provide a novel optical scanning system which is cheap to manufacture, which has an excellent $f_\theta$ characteristic and which satisfactorily corrects curvature of field in the sub scanning parallel direction.

An optical scanning system according to the present invention is "an anamorphic optical scanning system which exhibits an $f_\theta$ function in a main scanning parallel direction and in which a deflecting reflection facet position and a surface-to-be-scanned position are approximately in geometric optical conjugation in a sub scanning parallel direction." The "$f_\theta$ function" is a function to ensure that "the moving speed of a light spot", which is created by luminous flux which is deflected at a constant angular velocity stays constant on a surface-to-be-scanned.

For a better understanding of the present invention, reference is made to the following description and accompanying drawings while the scope of the invention will be pointed out in the appended claims.

DETAILED DESCRIPTION OF THE INVENTION

Figure 1:
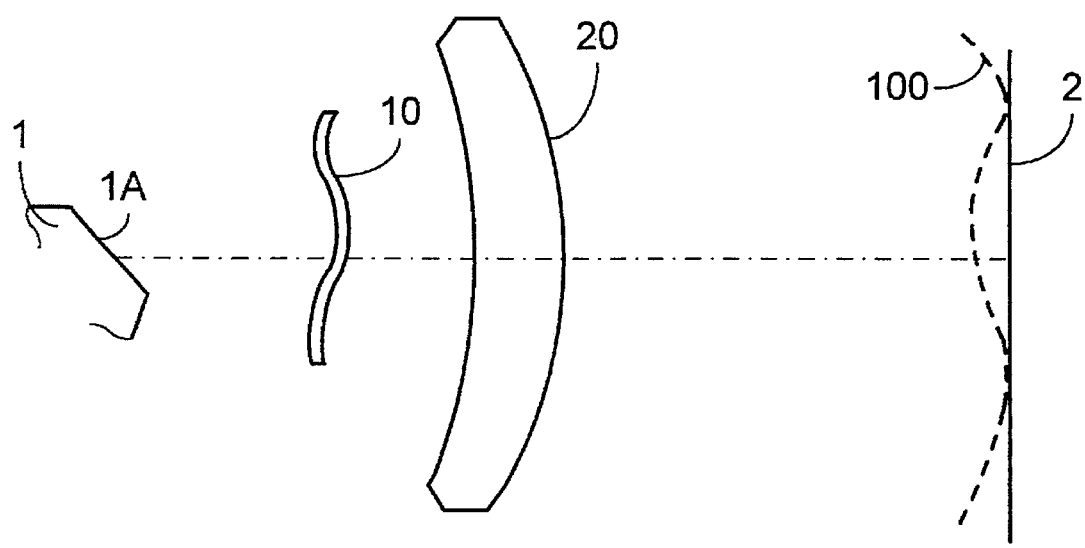
FIG. 1 is a view for explaining the optical scanning system according to the present invention.

As shown in FIG. 1, the optical scanning system is formed by two or more lenses 10 and 20. One of the two or more lenses is a corrector lens which corrects curvature of field in the sub scanning parallel direction. In FIG. 1, the lens 10 is the "corrector lens."

The corrector lens 10 is made of plastic so as to have a substantive power only in the sub scanning parallel direction (i.e., a direction which is perpendicular to the plane of FIG. 1). The corrector lens 10 is smoothly curved along its longitudinal direction into a shape which corrects curvature of field 100 at a narrow angle of view in the sub scanning parallel direction. The cross-sectional configuration of the corrector lens 10 taken in a plane which is parallel to a central optical axis (an optical axis which is common to the lenses 10 and 20, that is, an optical axis of the lens 20) and perpendicular to the main scanning parallel direction (i.e., a plane which is parallel to the central optical axis shown by the dotted line in FIG. 1 and perpendicular to the plane of FIG. 1) is approximately the same along the longitudinal direction of the corrector lens (i.e., a vertical direction in FIG. 1).

Since the corrector lens 10 has a substantive power only in the sub scanning parallel direction, it is the lens 20 that corrects an image plane and the $f_\theta$ characteristic in the main scanning parallel direction at a narrow angle of view. That is, at a dominantly influential narrow angle of view, an image plane in the sub scanning parallel direction is corrected by the corrector lens while the image plane and the $f_\theta$ characteristic in the main scanning parallel direction are corrected by another lens independently of the corrector lens.

At a wide angle of view, since the corrector lens itself influences the image plane and the $f_\theta$ characteristic in the main scanning parallel direction, correction of the image plane and the $f_\theta$ characteristic is performed by the lens system as a whole.

Although the corrector lens 10 is located on the deflecting reflection facet 1A side of an optical deflector 1 (a rotation polygon mirror is illustrated as an example of the optical deflector 1) in FIG. 1a, the corrector lens may be disposed on the surface-to-be-scanned 2 side of the lens 20.

The lens 20 may be a single lens as shown in FIG. 1a, or may be formed by a plurality of lenses. For instance, the lens 20 may be formed by two lenses so that the optical scanning system as a whole has a "triple-lens structure." In this case, the corrector lens system may be located "on the deflecting reflection facet side or the surface-to-be-scanned side" as described above, or the corrector lens may be "the second lens from the deflecting reflection facet side".

With respect to lens materials of the optical scanning system, the corrector lens is made of plastic as described earlier. Alternatively, all lenses of the optical scanning system may be made of plastic.

The power of the corrector lens in the sub scanning parallel direction may be "negative" or "positive". In the example of FIGS. 1a, 1b and 1c, although the power of the corrector lens in the sub scanning parallel direction is "positive," if the corrector lens is formed to have a "negative" power in the sub scanning parallel direction, the "curves" of the corrector lens 10 along its longitudinal direction are to be inverted from those shown in FIGS. 1a, 1b and 1c.

In the present invention, the optical scanning system including the corrector lens is initially designed so as to excellently correct an image plane and an $f_\theta$ characteristic in the main scanning parallel direction without including "longitudinal direction curves" into the shape of the corrector lens. Thereafter, the "longitudinal direction curves" of the corrector lens are determined so that expected curvature of field in the sub scanning parallel direction will be corrected satisfactorily. Plastic is then molded into the shape thus determined including the "longitudinal direction curves" in such a manner that the corrector lens is formed.

When the corrector lens is curved along its longitudinal direction (which extends in the main scanning parallel direction), the imaging position of the optical scanning system in the sub scanning parallel direction will be changed in accordance with the "longitudinal direction curves." Correction of curvature of field in the sub scanning parallel direction at a narrow angle of view is achieved utilizing this phenomena. At a wide angle of view, since the longitudinal configuration of the corrector lens influences the image plane and the $f_\theta$ characteristic in the main scanning parallel direction, correction of the image plane and the $f_\theta$ characteristic is attained by realizing a sextic or higher-order aspherical coefficient.

Since "the cross-sectional configuration of the corrector lens taken at the plane which is parallel to the central optical axis and perpendicular to the main scanning parallel direction is approximately constant along the longitudinal direction of the corrector lens," the corrector lens is easy to shape at a low manufacturing cost. It is easy to measure the configuration of the corrector lens since the cross-sectional configuration of the corrector lens remains unformed. The corrector lens as it is initially designed, including no curves along its longitudinal direction (i.e., the original configuration of the corrector lens), may be a cylinder lens or a toroidal lens.

In the following, four specific embodiments will be described. The "preamble" of the four embodiments is as follows. That is, luminous flux from a light source is collimated into parallel luminous flux, converged only in the sub scanning parallel direction and focused as "a long slit image which extends in the main scanning parallel direction" in the vicinity of a deflecting reflection facet 1A of a rotation polygon mirror 1 which is disposed as an optical deflector having six deflecting reflection facets (See FIG. 1a). As the rotation polygon mirror 1 rotates, the light is deflected at a constant angular velocity so as to be focused by the optical scanning systems 10 and 20 on a surface-to-be-scanned 2 as a light spot.

Hence, in the optical scanning system, "infinity on the light source side and the position of the surface-to-be-scanned 2" are in optical conjugation in the main scanning parallel direction while "the position of the deflecting reflection facet 1A and the position of the surface-to-be-scanned 2" are in optical conjugation in the sub scanning parallel direction.

The four embodiments below each require that the optical scanning system is formed by three lenses, and the three lenses are all made of plastic.

Figure 2A:
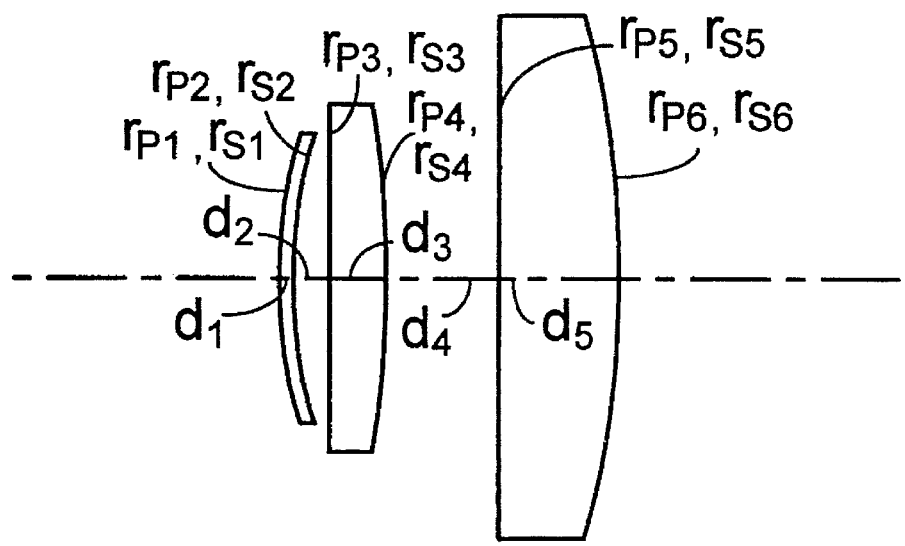
FIG. 2a is a view for explaining the first embodiment.

In FIG. 2(a), radii of curvature of an i-th lens from the deflecting reflection facet side in the main and the sub scanning directions are $r_{Pi}$ and $r_{Si}$ (i=1 to 6), respectively, and a surface-to-surface distance between the i-th lens surface and the (i+1)-th lens surface from the deflecting reflection facet side on an optical axis is $d_i$ (i=1 to 5). Denoted as $d_6$ is a distance between the sixth lens surface and the surface-to-be-scanned taken on the optical axis. The refractive index of a j-th lens from the object side with respect to a wavelength of 690 nm is denoted by $n_j$ (j=1 to 3).

An "intrinsic incident angle" to the rotation polygon mirror which is formed as an optical deflector, that is, an angle between an optical axis of luminous flux which is incident upon a deflecting reflection facet from the light source side and the optical axis of the optical scanning system (i.e., the central optical axis) is θ. An inscribed circle radius is R. A coordinate point of "an intersection of the optical axis of luminous flux which is incident upon a deflecting reflection facet from the light source side and the optical axis of the optical scanning system" is expressed in a coordinate system which has an origin which is located at the position of the rotation axis of the rotation polygon mirror, an X-axis which extends parallel to the optical axis of the optical scanning system and a Y-axis which extends perpendicular to the X-axis. A distance between the "intersection" and a lens surface of a first lens which is directed to the deflecting reflection facet side is 1, and a distance from the center of the image plane to the maximum image height is h.

The lens surface configuration of the corrector lens in the main scanning parallel direction (i.e., a cross-sectional configuration taken in a plane which includes the center optical axis and which is parallel to the main scanning parallel direction) is such a configuration in which the quantity of a curve $z_p(y)$ at a coordinate position y measured from the center optical axis along the main scanning parallel direction is expressed as:

$$z_p(y) = cy^2/\{1 + \sqrt{[1-(1+K)\ c^2y^2]}\} + By^6 + Cy^8 + Dy^{10} + Ey^{12}$$

The configuration is specified by substituting in the conical constant K and the coefficients B, C, D and E. The symbol C denotes a curvature on the optical axis (i.e., an inversed number of a radius of curvature). By ensuring that the coefficients B, C, D and E are sextic or higher-order coefficients, the corrector lens has a shape which is smoothly curved along its longitudinal direction.

An "aspherical surface" used in the respective embodiments is a curved surface which is obtained by rotating a curve expressed as below around an optical axis:

$$Z = cH^2/\{1 + \sqrt{[1-(1+K)\ c^2H^2]}\} + AH^4 + BH^6 + CH^8 +$$

$$DH^{10} + EH^{12} + FH^{14} + GH^{16}$$

where a Z-coordinate is measured along the optical axis, an H-coordinate is measured along a direction which is perpendicular to the optical axis, a curvature on the optical axis (i.e., an inversed number of a radius of curvature) is c, a conical constant is K and high-order aspherical coefficients are A, B, C, D, E, F, and G. The configuration of the aspherical surface is specified by substituting in the conical constant K and the aspherical coefficients A, B, C, D, E, F, and G. With respect to the coefficients B to E and the aspherical coefficients A to G, the letters E and the numbers which immediately follow indicate powers. For example, "E-9" expresses $1/10^9$. In short, the precedent figure is to be raised to the power which is expressed by the subsequent figure.

First Embodiment

The first embodiment requires the optical scanning system to be formed by three lenses as shown in FIG. 2(a). The lens which is located nearest the deflecting reflection facet is the corrector lens.

| i | $r_{Pi}$ | $r_{Si}$ | $d_i$ | j | $n_j$ |
|---|----------|----------|---------|---|---------|
| 1 | 60.00    | ∞        | 1.0000  | 1 | 1.48601 |
| 2 | 60.00    | 10.0     | 3.0000  |   |         |
| 3 | ∞        | ∞        | 6.5000  | 2 | 1.48601 |
| 4 | −107.8224 | −107.8224 | 12.5000 |   |         |
| 5 | ∞        | ∞        | 12.0000 | 3 | 1.48601 |
| 6 | −80.0    | −13.48   | 79.9991 |   |         |

First surface
K=O, B=0.45E-8, C=−0.66E-11, D=−0.21E-13
Second surface K=O, B=0.45E-8, C=−0.66E-11, D=−0.21E-13
Fourth surface
K=−1.0E+1, A=+0.135E-5, B=−0.58E-9, C=−0.35E-14, D=0.30E-15, E=−0.30E-17, F=−0.30E-19, G=0.30E-22
Fifth surface
K=O.O, A=0.57E-6, B=−0.26E-9, C=−0.12E-12, D=−0.18E-15, E=0.50E-19, F=0.95E-22, G=0.13E-24
θ=85.0 (degrees), R=12.990, X=+9.772, Y=+8.954, l=20, h=50
Focal length in the main scanning parallel direction=+100.0

Figure 2B:
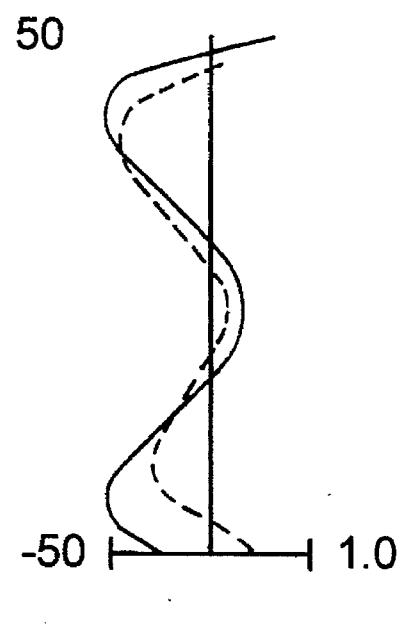
FIGS. 2b and 2c illustrate the respective curvature of the field and the $f_\theta$ characteristic.
Figure 2C:
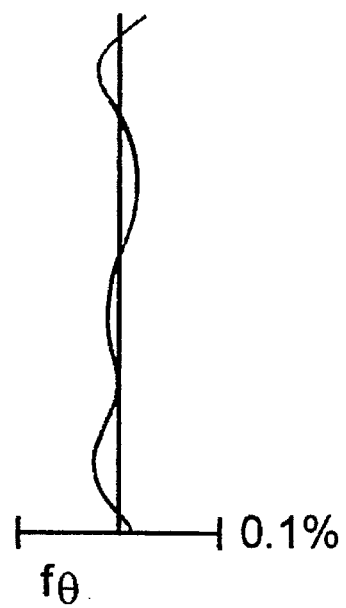
Figure 3A:
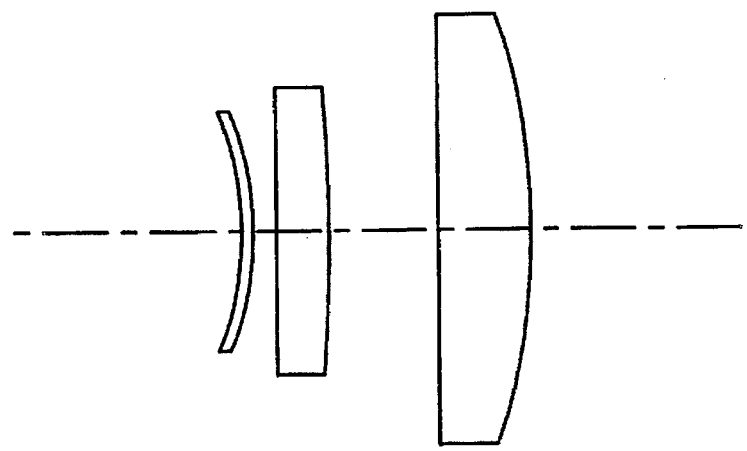
FIG. 3a is a view for explaining the second and third embodiments.

The curvature of field and the $f_θ$ characteristic in the first embodiment are shown in FIGS. 2(b) and 2(c). The second and third embodiments both require the optical scanning system to be formed by three lenses as shown in FIG. 3(a). The lens which is located nearest the deflecting reflection facet side is the corrector lens.

Second Embodiment

| i | $r_{pi}$ | $r_{si}$ | $d_i$ | j | $n_j$ |
|---|----------|----------|--------|---|---------|
| 1 | −100.000 | 20.0 | 1.0000 | 1 | 1.48601 |
| 2 | −100.000 | ∞ | 3.0000 | | |
| 3 | ∞ | −7.0 | 6.2000 | 2 | 1.48601 |
| 4 | −111.8531 | −111.8531 | 7.8000 | | |
| 5 | ∞ | ∞ | 16.6000 | 3 | 1.48601 |
| 6 | −79.5 | −12.4 | 79.9991 | | |

First surface
K=O, B=0.77E-8, C=−0.23E-11, D=−0.14E-13, E=−0.50E-15
Second surface
K=O, B=0.77E-8, C=−0.23E-11, D=−0.14E-13, E=−0.50E-15
Fourth surface
K=−0.23E+1, A=0.60E-6, B=0.156E-9, C=−0.154E-12, D=0.34E-15, E=0.22E-18, F=0.31E-21, G=O.lOE-22
Fifth surface
K=O.O, A=0.33E-6, B=−0.31E-9, C=0.20E-12, D=−0.19E-15, E=0.58E-19, F=0.58E-23, G=−0.15E-24
θ=85.0 (degrees), R=12.990, X=+9.884, Y=9.057, l=20, h=62

Focal length in the main scanning parallel direction=+100.0

Figure 3B:
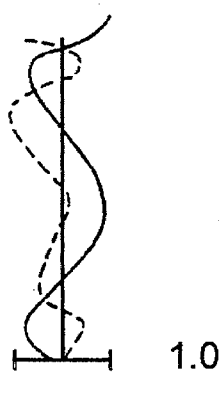
FIGS. 3b and 3d illustrate the respective curvature of the field.
Figure 3C:
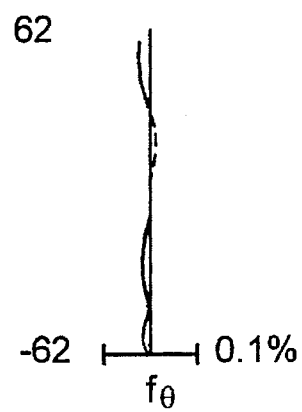
FIGS. 3c and 3e illustrate the $f_\theta$ characteristic, respectively.

The curvature of field and the $f_\theta$ characteristic in the second embodiment are shown in FIGS. 3(b) and 3(c).

Third Embodiment

| i | $r_{pi}$ | $r_{si}$ | $d_i$ | j | $n_j$ |
|---|----------|----------|--------|---|---------|
| 1 | −25.00 | 20.0 | 1.0000 | 1 | 1.48601 |
| 2 | −25.00 | ∞ | 3.0000 | | |
| 3 | ∞ | −5.0 | 6.5000 | 2 | 1.48601 |
| 4 | −119.4843 | −119.4843 | 12.5000 | | |
| 5 | ∞ | ∞ | 12.0000 | 3 | 1.48601 |
| 6 | −79.5 | −12.09 | 79.9991 | | |

First surface
K=O, B=0.77E-8, C=−0.23E-11, D=−0.13E-13
Second surface K=O, B=0.77E-8, C=−0.23E-11, D=−0.13E-13
Fourth surface
K=−0.23E+1, A=O.llE-5, B=0.70E-9, C=−0.155E-12, D=+0.34E-15, E=0.15E-17, F=0.31E-21, G=0.50E-22
Fifth surface
K=O.O, A=0.46E-6, B=−0.26E-9, C=0.12E-12, D=−0.19E-15, E=0.70E-18, F=O.lE-22, G=−0.50E-25
θ=85.0 (degrees), R=12.990, X=+9.772, Y=8.954, l=20, h=50
Focal length in the main scanning parallel direction=+100.0

Figure 3D:
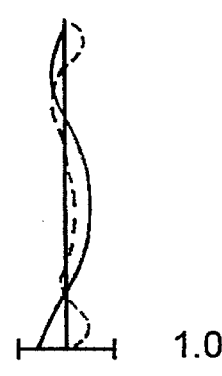
Figure 3E:
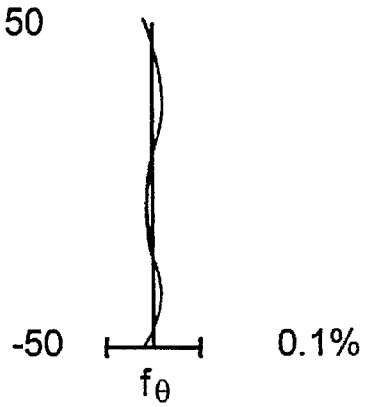

The curvature of field and the $f_\theta$ characteristic in the third embodiment are shown in FIGS. 3(d) and 3(e).

Fourth Embodiment

Figure 4A:
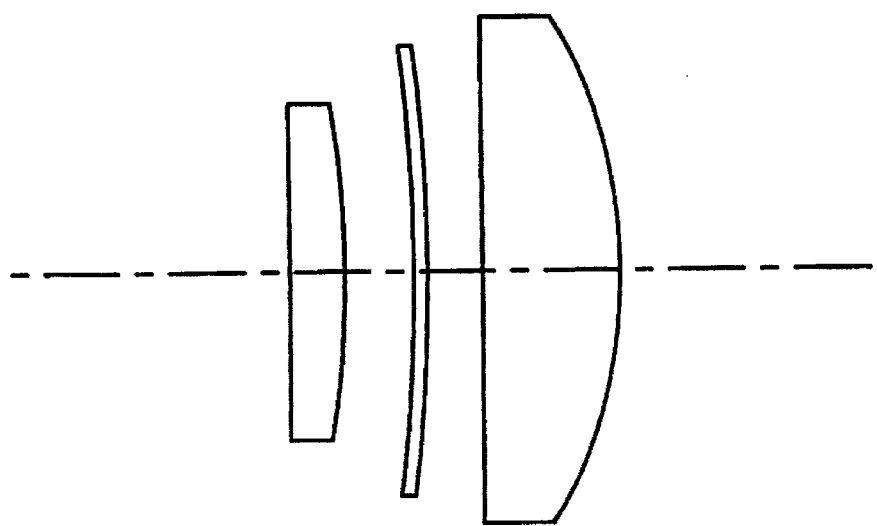
FIG. 4a is a view for explaining the fourth embodiment.

The fourth embodiment requires the optical scanning system to be formed by three lenses as shown in FIG. 4(a). The second lens from the deflecting reflection facet side is the corrector lens.

Fourth Embodiment

| i | $r_{pi}$ | $r_{si}$ | $d_i$ | j | $n_j$ |
|---|----------|----------|--------|---|---------|
| 1 | ∞ | ∞ | 6.4000 | 1 | 1.48601 |
| 2 | −141.9478 | −141.9478 | 7.7000 | | |
| 3 | −800.0000 | −17.0 | 1,5000 | 2 | 1.48601 |
| 4 | −800.0000 | ∞ | 6.8000 | | |
| 5 | ∞ | ∞ | 16.5000 | 3 | 1.48601 |
| 6 | −67.2 | −12.65 | 79.9991 | | |

Second surface
K=−0.12E+2, A=0.124E-5, B=−0.605E-9, C=−0.917E-12, D=−0.308E-15, E=−0.327E-18, F=−0.395E-21, G=−0.337E-23
Third surface
K=O, B=−O.lE-8, C=−0.20E-11, D=−0.50E-15
Fourth surface
K=O, B=−O.lE-8, C=−0.20E-11, D=−0.50E-15
Fifth surface
K=O.O, A=0.40E-6, B=−0.50E-9, C=+0.80E-13, D=0.20E-17, E=−0.325E-21, F=−0.995E-23, G=−0.215E-25
θ=85.0 (degrees), R=12.990, X=+9.884, Y=9.057, l=20.0, h=62
Focal length in the main scanning parallel direction=+100.0

Figure 4B:
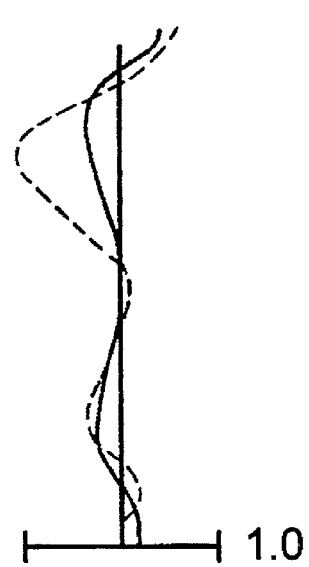
FIGS. 4b and 4c illustrate the respective curvature of the field and $f_\theta$ characteristic.
Figure 4C:
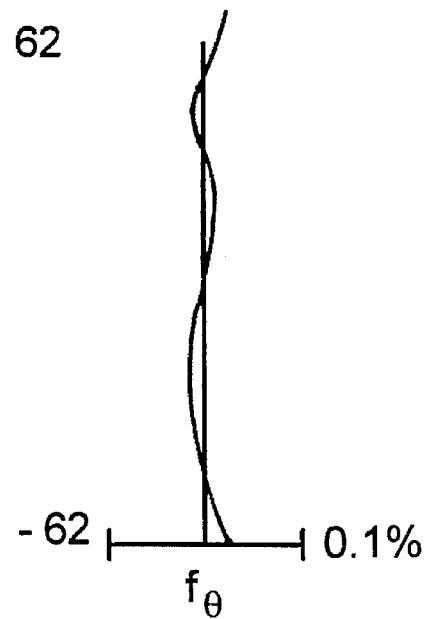
Figure 5A:
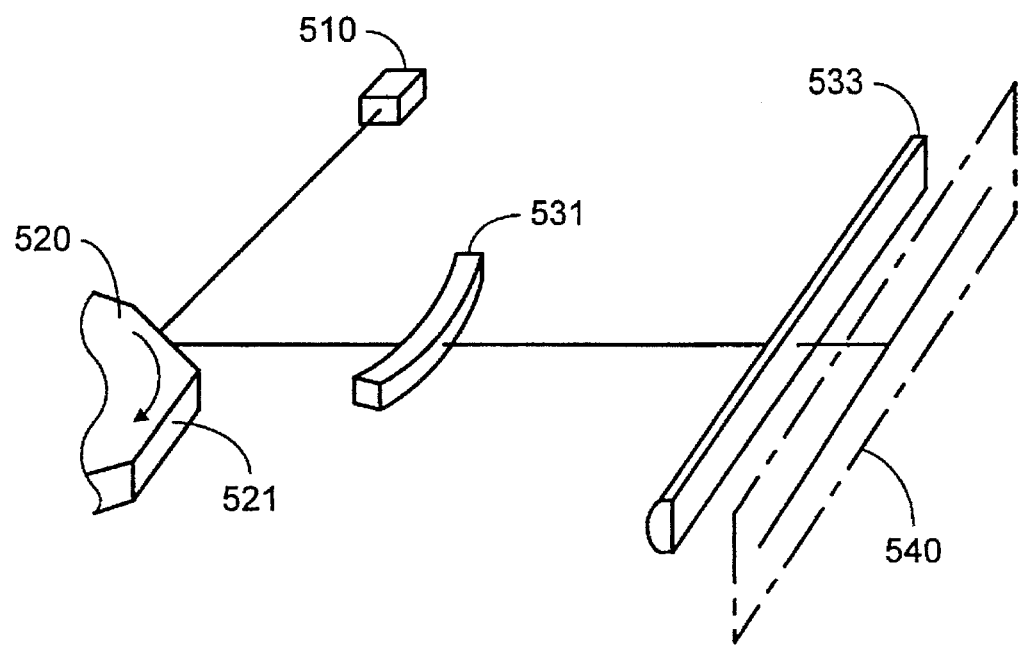
FIGS. 5A and 5B are views for explaining two typical examples of an optical scanning apparatus.
Figure 5B:
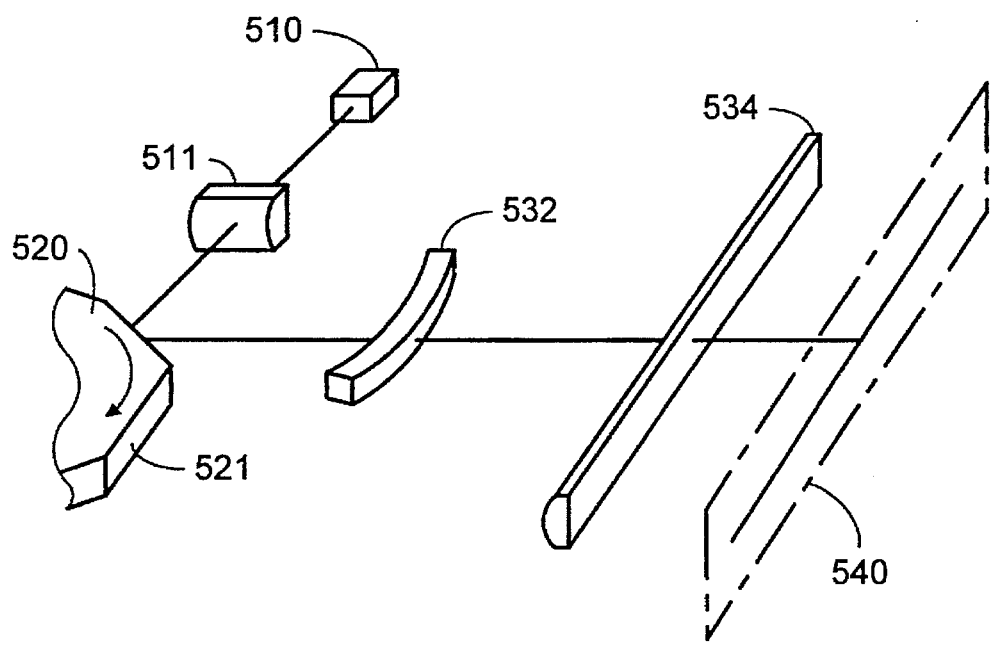

The curvature of field and the $f_\theta$ characteristic in the fourth embodiment are shown in FIGS. 4(b) and 4(c).

As heretofore described, the present invention offers a novel optical scanning system. Having such a structure as described above, the optical scanning system has an excellent $f_\theta$ characteristic and satisfactorily corrects curvature of field in the sub scanning parallel direction, which makes it possible to perform excellent optical scanning.

While the foregoing description and drawings represent the preferred embodiments of the present invention, it will be obvious to those skilled in the art that various changes and modifications may be made therein without departing from the true spirit and scope of the present invention.

What is claimed is:

1. An anamorphic optical scanning system which exhibits an $f_\theta$ function in a main scanning parallel direction and in which a deflecting reflection facet position and a surface-to-be-scanned position are substantially in geometric optical conjugation in a sub scanning parallel direction comprising:

two or more lenses, only one of said two or more lenses being a corrector lens which corrects curvature of field of said sub scanning parallel direction;

said corrector lens being (a) made of plastic so as to (b) have a substantive power only in said sub scanning parallel direction, said corrector lens being (c) curved along its longitudinal direction so as to correct curvature of field in said sub scanning parallel direction; and said corrector lens having (d) a cross-sectional configuration taken in a plane which is parallel to a central optical axis and perpendicular to said main scanning parallel direction which is substantially constant along the longitudinal direction of said corrector lens.

2. An optical scanning system according to claim 1, wherein said optical scanning system is formed by three lenses which are arranged from a deflecting reflection facet side to a surface-to-be-scanned side in order, and wherein said corrector lens is disposed on one of the deflecting reflection facet side and the surface-to-be-scanned side.

3. An anamorphic optical scanning system which exhibits an $f_\theta$ function in a main scanning parallel direction and in which a deflecting reflection facet position and a surface-to-be-scanned position are substantially in geometric optical conjugation in a sub scanning parallel direction comprising:

two or more lenses, only one of said two or more lenses being a corrector lens which corrects curvature of field of said sub scanning parallel direction;

said corrector lens being (a) made of plastic so as to (b) have a substantive power only in said sub scanning parallel direction, said corrector lens (c) being curved along its longitudinal direction so as to correct curvature of field in said sub scanning parallel direction; and said corrector lens having (d) a cross-sectional configuration taken in a plane which is parallel to a central optical axis and perpendicular to said main scanning parallel direction which is substantially constant along the longitudinal direction of said corrector lens, and wherein said optical scanning system is formed by three lenses which are arranged from a deflecting reflection facet side to a surface-to-be-scanned side in order, and wherein the second lens from the deflecting reflection facet side among said three lenses is said corrector lens.

4. An optical scanning system according to claim 1, wherein all lenses forming said optical scanning system are made of plastic.

5. An optical scanning system according to claim 1, wherein a power of said corrector lens in said sub scanning parallel direction is a negative power.

6. An optical scanning system according to claim 1, wherein a power of said corrector lens in said sub scanning parallel direction is a positive power.

* * * * *